(12) United States Patent
Li

(10) Patent No.: US 9,488,282 B2
(45) Date of Patent: Nov. 8, 2016

(54) GAS VALVE CAPABLE OF SWITCHING FOR TWO DIFFERENT GAS SUPPLIES

(71) Applicant: Ningbo Chaoyang Household Gas Stoves Co., Ltd., Ningbo (CN)

(72) Inventor: Xueya Li, Ningbo (CN)

(73) Assignee: Ningbo Chaoyang Household Gas Stoves Co., Ltd., Ningbo (CN)

( * ) Notice: Subject to any disclaimer, the term of this patent is extended or adjusted under 35 U.S.C. 154(b) by 40 days.

(21) Appl. No.: 14/735,951

(22) Filed: Jun. 10, 2015

(65) Prior Publication Data
US 2015/0377380 A1     Dec. 31, 2015

(30) Foreign Application Priority Data

Jun. 30, 2014     (CN) .......................... 2014 1 0307112

(51) Int. Cl.
| | | |
|---|---|---|
| *F16K 11/14* | (2006.01) | |
| *F16K 5/02* | (2006.01) | |
| *F16K 5/10* | (2006.01) | |

(52) U.S. Cl.
CPC ............. *F16K 5/0214* (2013.01); *F16K 5/103* (2013.01); *F16K 11/14* (2013.01)

(58) Field of Classification Search
USPC ............................. 137/625.42; 251/286–288
See application file for complete search history.

(56) References Cited

U.S. PATENT DOCUMENTS

| | | | | |
|---|---|---|---|---|
| 2,909,217 | A * | 10/1959 | Lamar ...................... | F16K 5/12 137/625.19 |
| 4,637,420 | A * | 1/1987 | Dyer ....................... | F02C 9/263 137/242 |
| 7,156,370 | B2 * | 1/2007 | Albizuri ................ | F16K 5/0214 126/39 E |
| 7,174,913 | B2 * | 2/2007 | Albizuri ................... | F24C 3/12 137/556 |
| 7,226,285 | B2 * | 6/2007 | Tsai ........................ | F23D 14/60 126/238 |
| 7,651,330 | B2 * | 1/2010 | Albizuri ................ | F16K 5/0214 126/39 E |
| 8,281,780 | B2 * | 10/2012 | Carvalho ................ | F23N 1/007 126/25 R |

* cited by examiner

*Primary Examiner* — John Fox
(74) *Attorney, Agent, or Firm* — Wang Law Firm, Inc.

(57) ABSTRACT

A gas valve capable of switching for two different gas supplies, has two outlets, two independent rotation positioning areas and two staggered groups of fire holes, one outlet responds to the first gas supply, and the other outlet corresponds to a second gas supply; when the gas valve is mounted on a stove, each outlet is connected to the gas nozzle fit for the corresponding gas supply, then when the corresponding gas supply is used, only the valve rod is switched to the corresponding rotating positioning area, the rotating positioning area corresponds to the corresponding group of fire holes and outlet, only the outlet fit for the gas supply supplies gas to the stove at the moment, and the other outlet is in a closed state all the time, so the gas valve capable of switching for two different gas supplies can be realized without replacing the gas nozzles.

10 Claims, 15 Drawing Sheets

GAS VALVE CAPABLE OF SWITCHING FOR TWO DIFFERENT GAS SUPPLIES

RELATE APPLICATIONS

This application claims the benefit of Chinese invention Application 201410307112.1, filed on Jun. 30, 2014, the specification of which is incorporated herein by this reference.

FIELD OF THE INVENTION

The present invention relates to a kind of gas valve, especially to a kind of a gas valve which can switch the corresponding gas inlet according to different gas supplies.

DESCRIPTION OF THE PRIOR ART

The gas valve in varies of gas appliances is a manual valve to control the gas supply. The common gas valve generally comprises a valve body including an inlet, an outlet, and a rotatable valve core. A spring cavity is formed at the upper portion of the valve core, a ventilation cavity is formed at the lower portion of the valve core, a valve rod capable of driving the valve core to rotate is disposed in the valve body, a spring keeping the valve rod moving up and being disconnected from the valve core presses against the lower portion of the valve rod, the spring is positioned in the spring cavity of the valve core, and a large fire hole and a small fire hole communicated with the inlet and the outlet are formed on the side wall of the ventilation cavity of the valve core. When the gas valve is used, the outlet of the valve body is connected with a gas nozzle by a hose, the gas nozzle enters the cooking range of a gas stove, the user operates the valve rod through a knob arranged on an operation panel, generally, the knob is pressed first and rotated anticlockwise to drive the valve core to rotate anticlockwise, then the large fire hole on the valve core is communicated with the inlet passage in the valve body, and the gas supply can pass the inlet, the large fire hole, the ventilation cavity and the outlet and can be ejected from the nozzle and used by the gas appliance. When the fire needs to be reduced, the user continuously rotates the knob anticlockwise, to communicate the small fire hole on the valve core with the inlet in the valve body, so as to reduce the flow passage of the gas supply and achieve the purpose of reducing the fire. If the user wants to change the small fire into the most intensive fire, that is, the valve core needs to be turned back, the communication between the small fire hole of the valve core and the inlet in the valve body is changed into the communication between the large fire hole of the valve core and the inlet passage in the valve body.

Nowadays, multiple energy sources are exploited and used, then the phenomenon of unitary energy sources changes. For example, liquefied petroleum gas, natural gas, dimethyl ether and the like are concurrently used as gas supplies widely in the gas appliance. When different types of gas supplies are concurrently used and should be exchanged with each other, as different gas has different heat values and the size of the small fire hole in the gas valve is definite, the small fire hole of the gas valve for the gas with high heat valve is smaller, while the small fire hole of the gas valve for the gas with low heat valve is larger. Nowadays, in an age with a shortage of energy sources, the gas supply of a whole residential area in many countries should be frequently replaced. As the difference of the gas supply will cause the difference in the quantity of flow required by the gas appliance, the initial common gas valve which is only fit for one type of gas and the corresponding nozzle should be replaced, so the cost of replacing is greatly increased, and it is neither beneficial for the generalization and application of new gas supply, nor beneficial for the implementation of changing to the new gas supply.

Aiming at the aforementioned current situation, a kind of two-gas exchangeable gas valve has appeared in the present market, e.g., a U.S. Patent (U.S. Pat. No. 7,156,370) and a Chinese utility model patent CN201487275U (Patent No. ZL200920191607.7) titled "Gas Rotary Valve", both disclose a kind of gas valve fit for two different gas supplies. The existing two-gas general gas valves are common in having only one outlet, the valve core is driven to rotate by rotating the valve rod, and the fire hole with different calibers on the valve core is selectively communicated with the outlet to adjust the gas output quantity, so that the gas valve is fit for different gas supplies. It means that, after gas switching in the gas valve, the gas nozzle connected with the outlet passage by the hose also needs to be replaced, and the gas nozzle is disposed in the cooking range, so the gas nozzle needs to be replaced by a professional.

Therefore, the existing two-gas general gas valves are quite inconvenient to operate in the adjusting process of switching the gas supplies.

SUMMARY OF THE INVENTION

It is an object of the present invention to provide a gas valve capable of switching for two different gas supplies which is very convenient in switching adjustment operation. In the present invention, after the switching, a gas nozzle does not need to be replaced, namely a foolproof switching adjustment operation can be realized without a professional, so the design is more humanized.

For achieving this object, a gas valve capable of switching for two different gas supplies, comprises: a valve body having a top end, an inlet, a first outlet and a second outlet; a valve core rotatably disposed inside the valve body, having a peripheral surface and a first group of fire holes and a second group of fire holes disposed thereon; a valve cover connected to the top end of the valve body, the valve cover having a center passage and an inner chamber with a first step and a second step; a rotatable valve rod for driving the valve core, the rotatable valve rod being inserted into the center passage of the valve cover, the rotatable valve rod having a protrusion extending away from the valve rod; a regulator with a rear end adjustably inserted into the inner chamber of the valve cover and the valve body, the regulator being able to adjust position of the protrusion; wherein, the inlet in communication with the first outlet through the first group of fire holes, and the inlet also in communication with the second outlet through the second group of fire holes; the first step and the second step in the inner chamber of the valve cover limit rotation of the protrusion; a first rotation positioning area is defined between the regulator and the first step, when the protrusion is inside the first rotation area, the first group of fire holes are in communication with the first outlet, and the second group of fire holes are not in communication with the second outlet; a second rotation positioning area is defined between the regulator and the second step, when the protrusion is in the second rotation area, the second group of fire holes are in communication with the second outlet, and the first group of fire holes are not in communication with the first outlet; when the regulator moves upward and the rear end of the regulator moves out of the inner chamber of the valve cover, the protrusion can move between both the first rotation positioning area and the second rotation positioning area.

The valve core has a spring recess for receiving a spring, and a center hole defined in an opposite end of the spring recess, the spring recess defines a wall and a receiving slot is formed on the wall for receiving the protrusion when the protrusion moves upward and downward; the two groups of fire holes communicate with the center hole, the valve rod extends inside the spring recess; the spring in the spring recess forces the valve rod to move upward; of course, the protrusion can also be a positioning wheel sleeved with the valve rod together, and the reference of the configuration of which is made to disclosure of the Chinese invention patent (patent NO. ZL201010164539.2), the protrusion can also not drive the valve core to rotate, and the valve core is driven to rotate in such a way that the valve core is directly matched with a flat hole between the valve rod and the valve core; the first step and the second step define a first arc-shaped raised portion inside the valve cover.

The first outlet is defined vertically above the second outlet, accordingly, the first group of fire holes are defined vertically above the second group of fire holes. Such design can optimize the setting of the fire holes on the valve core; and even if the first and second groups of fire holes are partially superposed in the axis of the valve core, as both the groups of fire holes and the outlets are provided staggered up and down, the groups of fire holes and the corresponding outlets can be matched with each other.

The regulator is a screw. The screw can conveniently adjust the position of the regulator to move up and down by rotating the screw.

The first group of fire holes includes a first large fire hole and a first small fire hole; when the protrusion rotates toward to the first step and is stopped by the first step, both of the first large fire hole and the first small fire hole are not in communication with the first outlet; when the protrusion rotates toward middle of the first rotation positioning area, the first large fire hole communicates with the first outlet; when the protrusion rotates toward the regulator in the first rotation positioning area and is stopped by the regulator, the first small fire hole communicates with the first outlet. The first group of fire holes including the first large fire hole and the first small fire hole can realize a large and small fire adjusting function when the first gas supply is used. Of course, the first group of fire holes may also include a plurality of fire holes with different apertures as required, to realize the adjustment of amount of fires.

A second arc-shaped raised portion and a third arc-shaped raised portion adjacent to each other are formed on the valve cover and inside the first rotation positioning area, the first arc-shaped raised portion has a height that is taller than a height of the second arc-shaped raised portion, the height of the second arc-shaped raised portion is taller than a height of the third arc-shaped raised portion; a first front recess is defined between the first arc-shaped raised portion and the second arc-shaped raised portion and receives the protrusion for positioning the protrusion, when the protrusion is located inside the first front recess, neither the first large fire hole nor the first small fire hole are in communication with the first outlet; when the protrusion is located between the second arc-shaped raised portion and the third arc-shaped raised portion, the first large fire hole is in communication with the first outlet; a first rear recess is defined between the third arc-shaped raised portion and the regulator for receiving the protrusion and positioning the protrusion, when the protrusion is located inside the first rear recess, the first small fire hole is in communication with the first outlet. The two arc-shaped raised portions are formed on the inner chamber of the valve cover in correspondence to two kinds of fire holes, so that the protrusion can be limited by the corresponding arc-shaped raised portion when the fire hole is in communication with the corresponding outlet to ensure the working stability of the gas valve.

A first space is formed between the top end of the valve body and the third arc-shaped raised portion for the protrusion to move downward and rotate, and a first opening is formed on the top end of the valve body providing a moving space for the protrusion when the protrusion moves downward and rotates relatively to the valve body; when the valve rod drives the valve core to moves downward and rotating away from a closing state of the fire holes and toward the first large fire hole, the protrusion moves inside the first opening; when the valve rod drives the valve core to moves downward and rotating the first large fire hole away from a communicating state toward the first small fire hole, the protrusion of the valve rod moves inside the first space. The first opening plays a role in limiting the protrusion when the rotating away from a closing state of the fire holes and toward the first large fire hole, that is, press and rotate the valve rod, and the valve rod is rotated to the end of the first opening to be limited, which means it is in communication with the large fire hole, then the valve rod is released and reset under the action of the spring; when the valve rod drives the valve core to rotate the first large fire hole away from a communicating state toward the first small fire hole, the protrusion moves inside the first space formed between the top end of the valve body and the third arc-shaped raised portion, the valve rod does not need to be pressed down at the moment, directly rotate the valve rod to adjust from the large fire state to small fire state, so such configuration is quite easy to fire adjustment operation.

The second group of fire holes includes a second large fire hole and a second small fire hole; when the protrusion of the valve rod rotates toward the regulator in the second rotation positioning area and is stopped by the regulator, neither of the second large fire hole nor a second small fire hole are in communication with the second outlet; when the protrusion rotates at the middle of the second rotation positioning area, the second large fire hole is in communication with the second outlet; when the protrusion rotates toward the second step and is stopped by the second step, the second small fire hole is in communication with the second outlet. The second group of fire holes including the second large fire hole and the second small fire hole can realize a large and small fire adjusting function when the first gas supply is used. Of course, the second group of fire holes may also include a plurality of fire holes with different apertures as required, to realize the adjustment of amount of fires.

A forth arc-shaped raised portion and a fifth arc-shaped raised portion adjacent to each other are formed on the valve cover inside the second rotation positioning area, the forth arc-shaped raised portion has a height that is taller than a height of the fifth arc-shaped raised portion, the height of the first arc-shaped raised portion is taller than the height of the forth arc-shaped raised portion; a second front recess is defined between the forth arc-shaped raised portion and the regulator for receiving the protrusion and positioning the protrusion, when the protrusion is located inside the second front recess, neither the second large fire hole nor the second small fire hole are not in communication with the second outlet; when the protrusion is located between the forth arc-shaped raised portion and the fifth arc-shaped raised portion, the second large fire hole is in communication with the second outlet; a second rear recess is defined between the fifth arc-shaped raised portion and the first arc-shaped raised portion for receiving the protrusion and positioning the protrusion, when the protrusion is located inside the second rear recess, the second small fire hole is in communication with the second outlet. The two arc-shaped raised portions are formed on the inner chamber of the valve cover in correspondence to two kinds of fire holes, so that the protrusion can be limited by the corresponding arc-shaped raised portion when the fire hole is in communication with the corresponding outlet to ensure the working stability of the gas valve.

A second space is formed between the top end of the valve body and the fifth arc-shaped raised portion for the protrusion to move downward and rotate, and a second opening is formed on the top end of the valve body providing a moving space for the protrusion when the protrusion moves downward and rotates relatively to the valve body; when the valve rod drives the valve core downward and rotates away from a closing state of the fire holes and toward the second large fire hole, the protrusion moves inside the second opening; when the valve rod drives the valve core downward and rotating away from a communicating state of the second large fire hole and toward the second small fire hole, the protrusion of the valve rod moves inside the second space. The second opening plays a role in limiting the protrusion when the rotating away from a closing state of the fire holes and toward the second large fire hole, that is, press and rotate the valve rod, and the valve rod is rotated to the end of the second opening to be limited, which means it is in communication with the large fire hole, then the valve rod is released and reset under the action of the spring; when the valve rod drives the valve core to rotate the second large fire hole away from a communicating state toward the second small fire hole, the protrusion moves inside the second space formed between the top end of the valve body and the fifth arc-shaped raised portion, the valve rod does not need to be pressed down at the moment, directly rotate the valve rod to adjust from the large fire state to small fire state, so such configuration is quite easy to fire adjustment operation.

The above inlet is positioned below the valve core, a top rod passes through the valve core and the top rod has a top end and a bottom end, the top end of the top rod attached to the bottom surface of the valve rod, the bottom end of the top rod passes through from the spring recess to the center hole; the spring is sleeve on the top rod, the spring has a top and a bottom, the top supports a retaining shoulder of the top rod and the bottom supports a collar that is sleeved on the top rod; the top rod has a sealing ring located under the collar. The valve rod will push the top rod to move downward and further push an electromagnetic valve disposed in the valve body, so as to guarantee the safety. Of course, the valve rod can also be designed to directly pass through the valve core, but such configuration is more complex and inconvenient for manufacturing.

The valve core has a lower portion in inverted truncated cone shape, and the valve body has an inner recess in truncated cone shape matching with the lower portion. The lower portion of the valve core is disposed inside the inner recess of valve body, which not only achieves a constraint effect on the valve core, but also can ensure tight attachment between the valve core and the valve body.

Compared with the prior art, in the present invention, this gas valve has two outlets, two completely independent rotation positioning areas and two staggered groups of fire holes, as one outlet corresponds to a rotation positioning area and a group of fire holes, different groups of fire holes correspond to different gases according to the difference of the groups of fire holes corresponding to the rotation positioning areas, in this way, one outlet can respond to the first gas supply, and the other outlet corresponds to a second gas supply; when the gas valve is mounted on a stove, each outlet is connected through a hose and the end of the hose to the gas nozzle fit for the corresponding gas supply, each gas nozzle is mounted inside a cooking range of the stove, then when the corresponding gas supply is used, only the valve rod is switched to the corresponding rotating positioning area, the rotating positioning area corresponds to the corresponding group of fire holes and outlet, only the outlet fit for the gas supply supplies gas to the stove at the moment, and the other outlet is in a closed state all the time, so the gas valve capable of switching for two different gas supplies can be realized without replacing the gas nozzles; in addition, the switching operation of the rotating positioning areas of the gas valve is also quite convenient, only the regulator is loosened during switching till the regulator does not block the protrusion, then the valve rod is rotated, the protrusion can cross the regulator and enter the second rotating positioning area, meanwhile, the valve core also rotates to the corresponding position along with the valve rod, thus ensuring that the corresponding group of fire holes can be in communication with the corresponding outlet by rotating the valve core in the rotating positioning area; the regulator is tightened downwards after switching, and then the regulator extends into the valve cover to limit the rotation of the protrusion, thus completing one-time adjustment; the nozzles do not need to be replaced in the adjusting process, and the adjustment can be realized only by twisting the regulator with a screwdriver and rotating the valve rod; in addition, a corresponding mark can be set at the corresponding knob position on the stove to prompt an operator of operation, so a foolproof switching adjustment operation can be implemented without a professional, and the design is more humanized.

DETAILED DESCRIPTION OF THE PREFERRED EMBODIMENT

Figure 1:
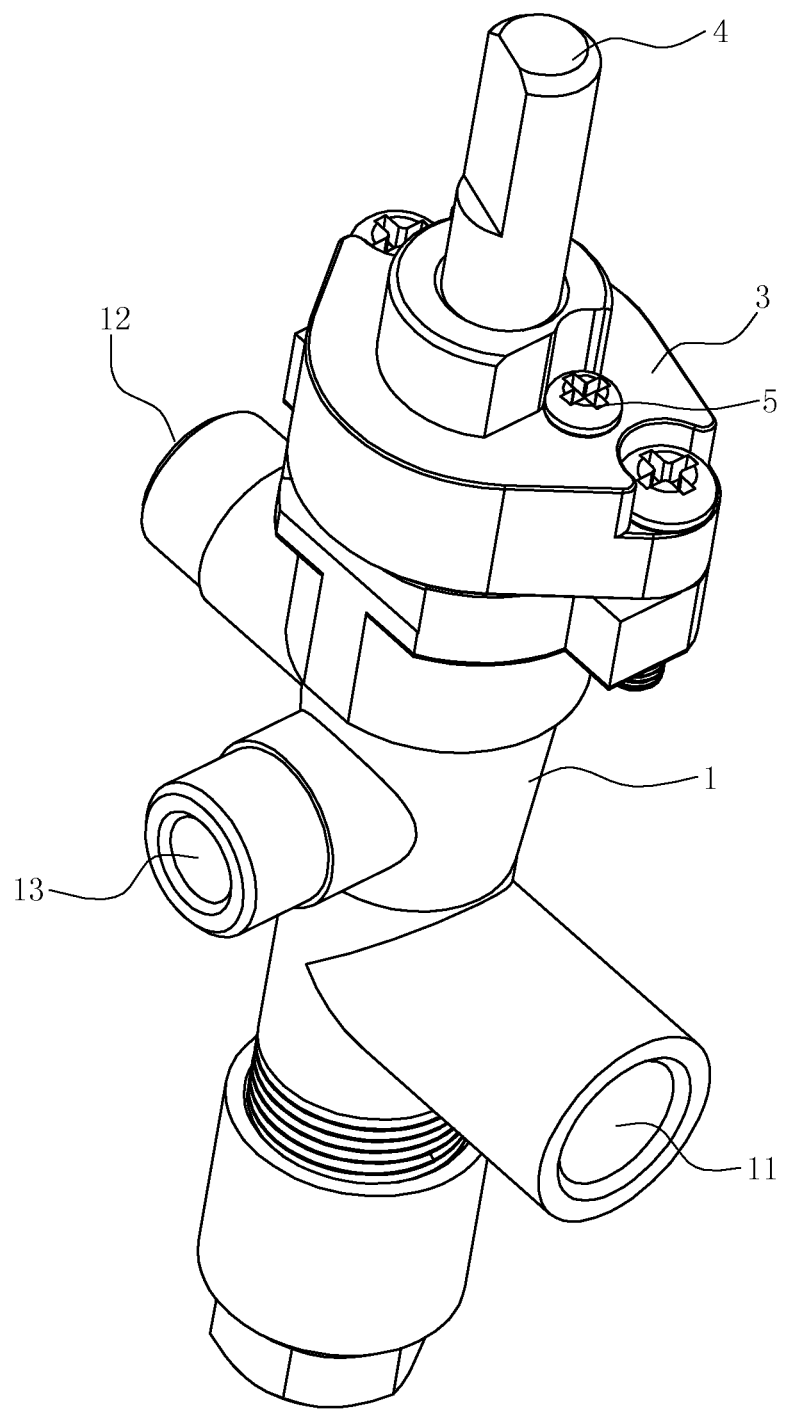
FIG. 1 is a perspective view of a gas valve capable of switching for two different gas supplies in accordance with an embodiment of the present invention.
Figure 2:
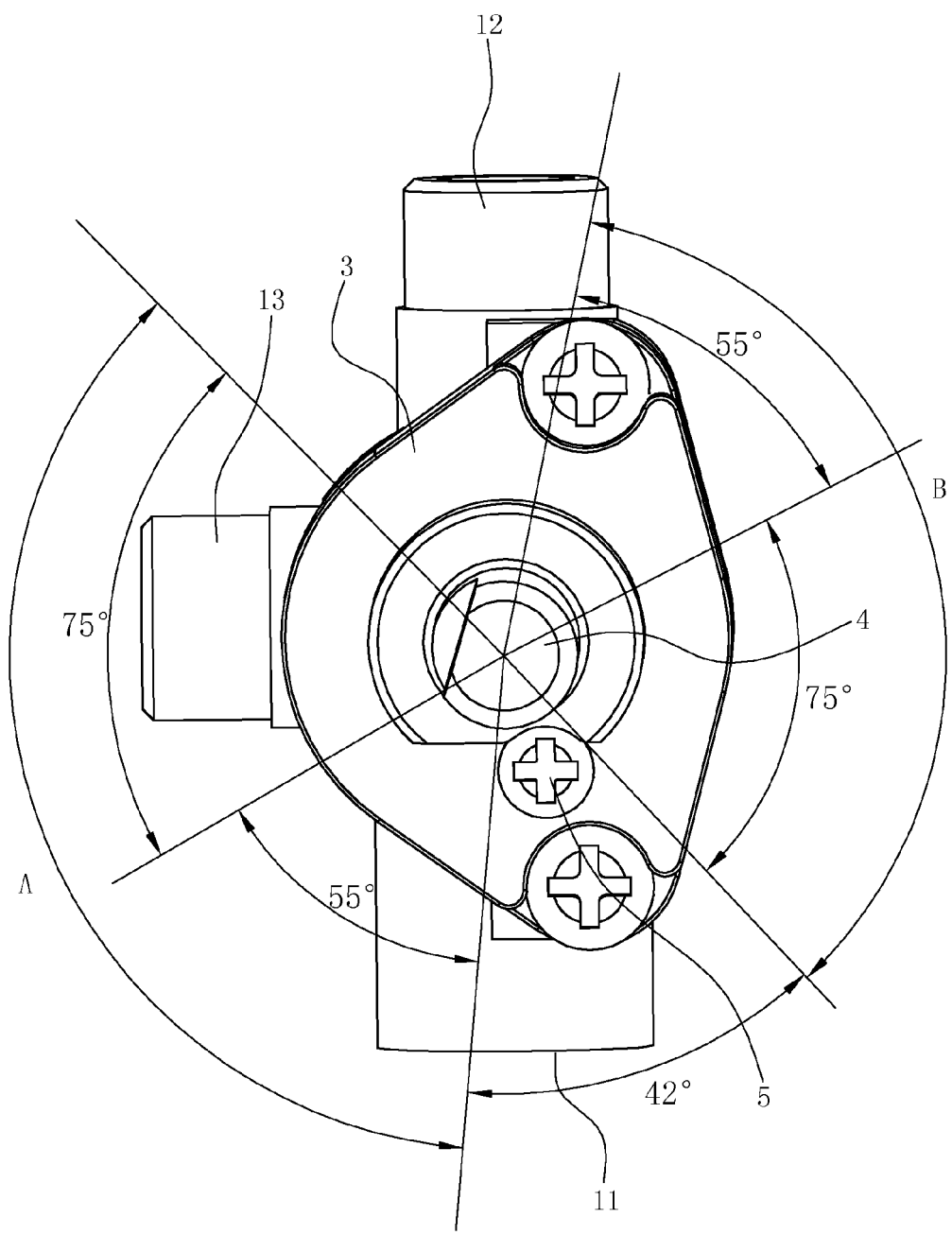
FIG. 2 is a top plan view of the gas valve illustrating the working principle in accordance with the embodiment of the present invention.

To enable a further understanding of the innovative and technological content of the invention herein, refer to the detailed description of the invention and the accompanying drawings below:

FIGS. 1 to 22 show a preferred embodiment.

A gas valve capable of switching for two different gas supplies comprises a valve body 1 having a top end, an inlet 11, a first outlet 12 and a second outlet 13; a valve core 2 rotatably disposed inside the valve body 1; a valve cover 3 connected to the top end of the valve body 1 by screw; a rotatable valve rod 4 for driving the valve core 2; two outlets, the first outlet 12 and the second outlet 13, the first outlet 12 defined vertically above the second outlet 13.

The valve core 2 has a spring recess 22, and a center hole 21 defined in an opposite end of the spring recess 22; the valve core has a lower portion 211 in inverted truncated cone shape, and the valve body 1 has an inner recess 16 in truncated cone shape matching with the lower portion 211; the valve rod 4 extends inside the spring recess 22, the valve rod has a protrusion 41 extending away from the valve rod 4; the spring recess 22 defines a wall and a receiving slot 221 is formed on the wall for receiving the protrusion 41, the protrusion 41 can move up and down in the receiving slot 221; rotating the valve rod 4, the protrusion 41 will be inserted into the receiving slot 221 and be stopped by the receiving slot 221, which will drive the rotation of the valve core 2.

The valve core 2 has a peripheral surface and a first group of fire holes 23,24 and a second group of fire holes 25,26 disposed thereon, the first group of fire holes 23,24 are defined vertically above the second group of fire holes 25,26. A spring 10 in the spring recess 22 forces the valve rod 4 to move upward, the inlet 11 is located below the valve core 2, a top rod 7 passes through the valve core 2 and the top rod 7 has a top end and a bottom end, the top end of the top rod 7 attached to the bottom surface of the valve rod 4, the bottom end of the top rod 7 passes through from the spring recess 22 to the center hole 21; the spring 10 is sleeve on the top rod 7, the spring 10 has a top and a bottom, the top supports a retaining shoulder 71 of the top rod 7 and the bottom supports a collar 8 that is sleeved on the top rod; the top rod 7 has a sealing ring 9 located under the collar 8.

Fire holes communicated with the ventilation cavity 21 are formed on the side wall of the valve core 2, and there are two groups of fire holes, respectively a first fire hole group 23 and 24 and a second fire hole group 25 and 26 which are staggered up and down. A spring 10 for keeping the valve rod 4 moving up is arranged in the spring cavity 22, the inlet 11 is positioned below the valve core 2, an ejector rod 7 also penetrates through the valve core 2, the upper end of the ejector rod 7 is in contact with the lower end surface of the valve rod 4, the lower end of the ejector rod 7 penetrates through the bottom surface of the spring cavity 22 and the ventilation cavity 21, the spring 10 is sleeved on the ejector rod 7, the upper end of the spring 10 presses against a retaining shoulder 71 at the upper part of the ejector rod 7, the lower end of the spring 10 presses against a retainer ring 8 sleeved on the ejector rod 7, a sealing ring 9 is also disposed on the ejector rod 7, and the sealing ring 9 is positioned below the retainer ring 8.

The inner chamber has a first step 311 and a second step 312 limiting rotation of the protrusion 41, the first step 311 and the second step 312 define a first arc-shaped raised portion 31 inside the valve cover 3; a regulator 5 with a rear end is adjustably inserted into the inner chamber of the valve cover 3 and the valve body, the regulator is able to adjust position of the protrusion 41, in this embodiment, the regulator 5 is a screw threaded connected to the valve cover 3.

A first rotation positioning area A is defined between the regulator 5 and the first step 311, when the protrusion 41 is inside the first rotation area A, the first group of fire holes 23,24 are in communication with the first outlet 12, and the second group of fire holes 25,26 are not in communication with the second outlet 13.

A second rotation positioning area B is defined between the regulator 5 and the second step 312, when the protrusion 41 is in the second rotation area B, the second group of fire holes 25,26 are in communication with the second outlet 13, and the first group of fire holes 23,24 are not in communication with the first outlet 12.

When the regulator 5 moves upward and the rear end of the regulator 5 moves out of the inner chamber of the valve cover 3, the protrusion 41 can move between both the first rotation positioning area A and the second rotation positioning area B.

In this embodiment, a second arc-shaped raised portion 32 and a third arc-shaped raised portion 33 adjacent to each other are formed on the valve cover 3 and inside the first rotation positioning area A, the first arc-shaped raised portion 31 has a height that is taller than a height of the second arc-shaped raised portion 32, the height of the second arc-shaped raised portion 32 is taller than a height of the third arc-shaped raised portion 33; a first front recess 6a is defined between the first arc-shaped raised portion 31 and the second arc-shaped raised portion 32 and receives the protrusion 41 for positioning the protrusion 41, when the protrusion 41 is located inside the first front recess 6a, neither the first large fire hole 23 nor the first small fire hole 24 are in communication with the first outlet 12; when the protrusion 41 is located between the second arc-shaped raised portion 32 and the third arc-shaped raised portion 33, the first large fire hole 23 is in communication with the first outlet 12; a first rear recess 6b is defined between the third arc-shaped raised portion 33 and the regulator 5 for receiving the protrusion 41 and positioning the protrusion 41, when the protrusion 41 is located inside the first rear recess 6b, the first small fire hole 24 is in communication with the first outlet 12.

A first space d1 is formed between the top end of the valve body 1 and the third arc-shaped raised portion 33 for the protrusion 41 to move downward and rotate, and a first opening 14 is formed on the top end of the valve body 1 providing a moving space for the protrusion 41 when the protrusion 41 moves downward and rotates relatively to the valve body 1; when the valve rod 4 drives the valve core to moves downward and rotating away from a closing state of the fire holes and toward the first large fire hole 23, the protrusion 41 moves inside the first opening 14; when the valve rod 4 drives the valve core to moves downward and rotating the first large fire hole 23 away from a communicating state toward the first small fire hole 24, the protrusion 41 of the valve rod 4 moves inside the first space d1.

The second group of fire holes 25,26 includes a second large fire hole 25 and a second small fire hole 26; when the protrusion 41 of the valve rod 4 rotates toward the regulator 5 in the second rotation positioning area B and is stopped by the regulator 5, neither of the second large fire hole 25 nor a second small fire hole 26 are in communication with the second outlet 13; when the protrusion 41 rotates at the middle of the second rotation positioning area B, the second large fire hole 25 is in communication with the second outlet 13; when the protrusion 41 rotates toward the second step 312 and is stopped by the second step 312, the second small fire hole 26 is in communication with the second outlet 13.

A forth arc-shaped raised portion 34 and a fifth arc-shaped raised portion 35 adjacent to each other are formed on the valve cover 3 inside the second rotation positioning area B, the forth arc-shaped raised portion 34 has a height that is taller than a height of the fifth arc-shaped raised portion 35, the height of the first arc-shaped raised portion 31 is taller than the height of the forth arc-shaped raised portion 34; a second front recess 6c is defined between the forth arc-shaped raised portion 34 and the regulator 5 for receiving the protrusion 41 and positioning the protrusion 41, when the protrusion 41 is located inside the second front recess 6c, neither the second large fire hole 25 nor the second small fire hole 26 are not in communication with the second outlet 13; when the protrusion 41 is located between the forth arc-shaped raised portion 34 and the fifth arc-shaped raised portion 35, the second large fire hole 25 is in communication with the second outlet 13; a second rear recess 6d is defined between the fifth arc-shaped raised portion 35 and the first arc-shaped raised portion 31 for receiving the protrusion 41 and positioning the protrusion 41, when the protrusion 41 is located inside the second rear recess 6d, the second small fire hole 26 is in communication with the second outlet 13.

A second space d2 is formed between the top end of the valve body 1 and the fifth arc-shaped raised portion 35 for the protrusion 41 to move downward and rotate, and a second opening 15 is formed on the top end of the valve body 1 providing a moving space for the protrusion 41 when the protrusion 41 moves downward and rotates relatively to the valve body 1; when the valve rod 4 drives the valve core downward and rotates away from a closing state of the fire holes and toward the second large fire hole 25, the protrusion 41 moves inside the second opening 15; when the valve rod 4 drives the valve core downward and rotating away from a communicating state of the second large fire hole 25 and toward the second small fire hole 26, the protrusion 41 of the valve rod 4 moves inside the second space d2.

No matter in the first rotation positioning area A or in the second rotation positioning area B, the rotating angle of the protrusion 41 rotating from the fire closing state to the large fire state is 75°; the rotating angle of the protrusion 41 rotating from the large fire state to the small fire state is 55°; and the rotating angle of the protrusion 41 from the end of a rotating positioning area to the start of the other rotating positioning area is 42°.

The using process and the principle of this gas valve are as follows:

As shown in FIGS. 3-11, the gas supply used by the gas valve is gas supply 1: the protrusion 41 of the valve rod rotates inside the first rotation positioning area A, both the first large fire hole 23 and the first small fire hole 24 are in communication with the first outlet 12, and the second large fire hole 25 and the second small fire hole 26 are not in communication with the second outlet 13.

Figure 3:
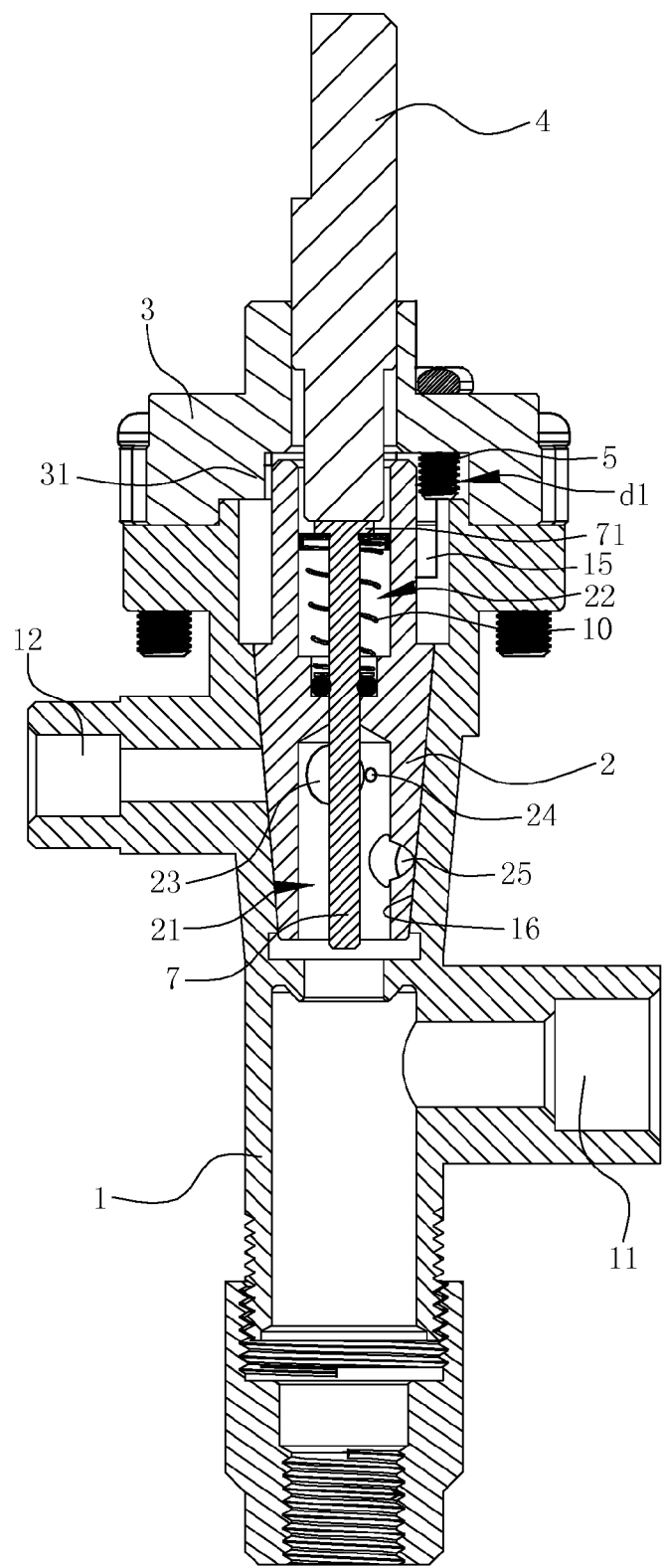
FIG. 3 is a sectional view of the gas valve (with the first gas supply, when in fire closing state) in accordance with the embodiment of the present invention.
Figure 4:
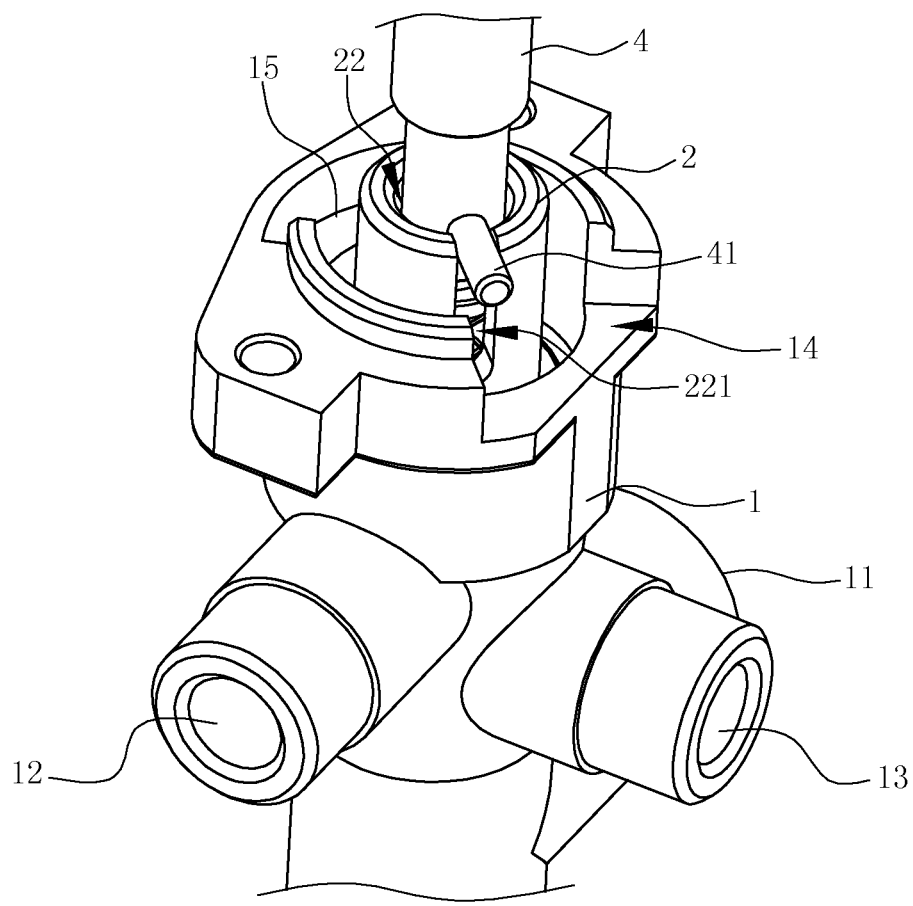
FIG. 4 is a perspective view of a valve rod and a valve body showing the position between both (with the first gas supply, when in fire closing state) in accordance with the embodiment of the present invention.
Figure 5:
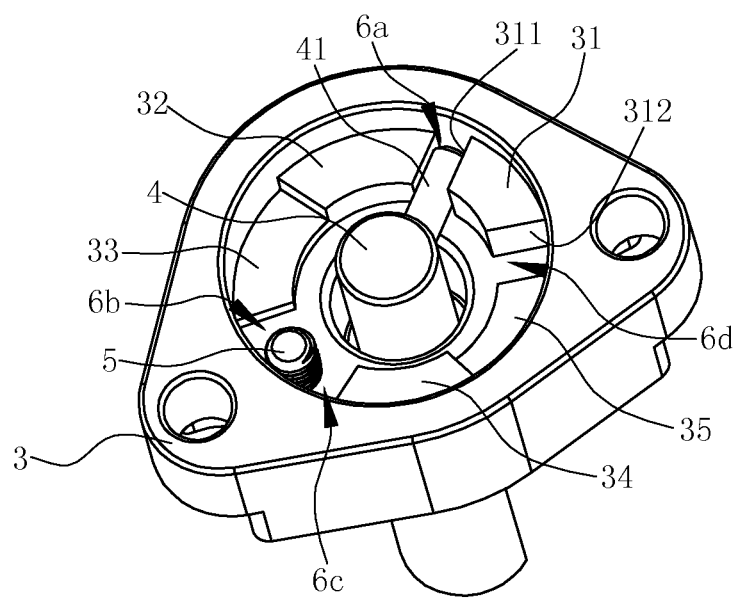
FIG. 5 is a perspective view of the valve rod and a valve cover showing the position between both (with the first gas supply, when in fire closing state) in accordance with the embodiment of the present invention.

As shown in FIGS. 3-5, in a fire closing state, when the protrusion 41 is located inside the first front recess 6a, neither the first large fire hole 23 nor the first small fire hole 24 are in communication with the first outlet 12.

Figure 6:
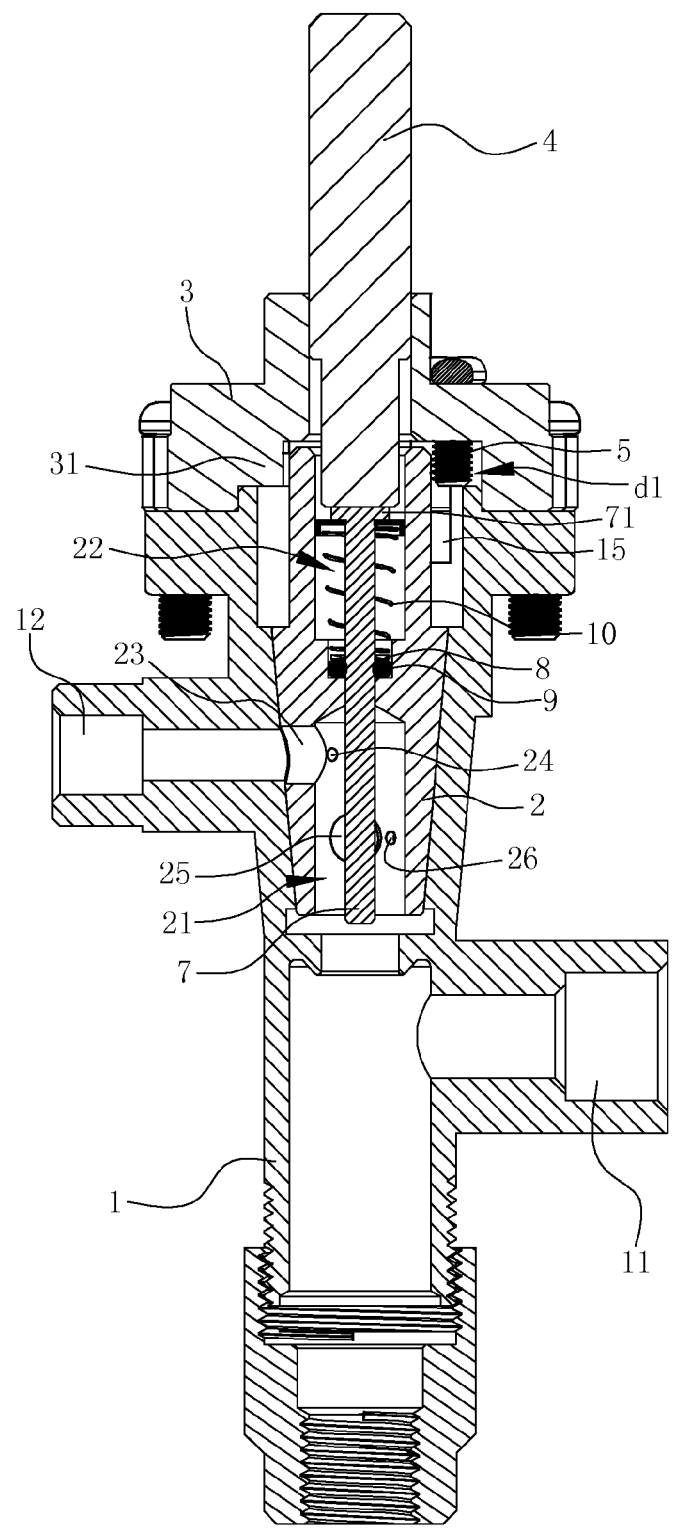
FIG. 6 is a sectional view of the gas valve (with the first gas supply, when in large fire state) in accordance with the embodiment of the present invention.
Figure 7:
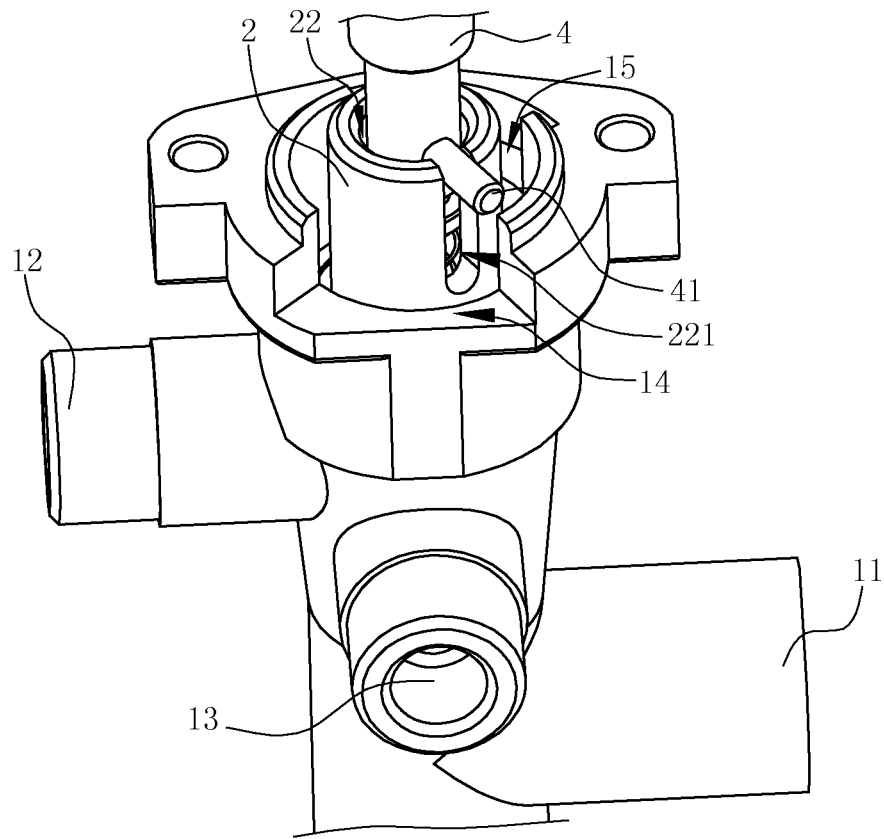
FIG. 7 is a perspective view of the valve rod and the valve body showing the position between both (with the first gas supply, when in large fire state) in accordance with the embodiment of the present invention.
Figure 8:
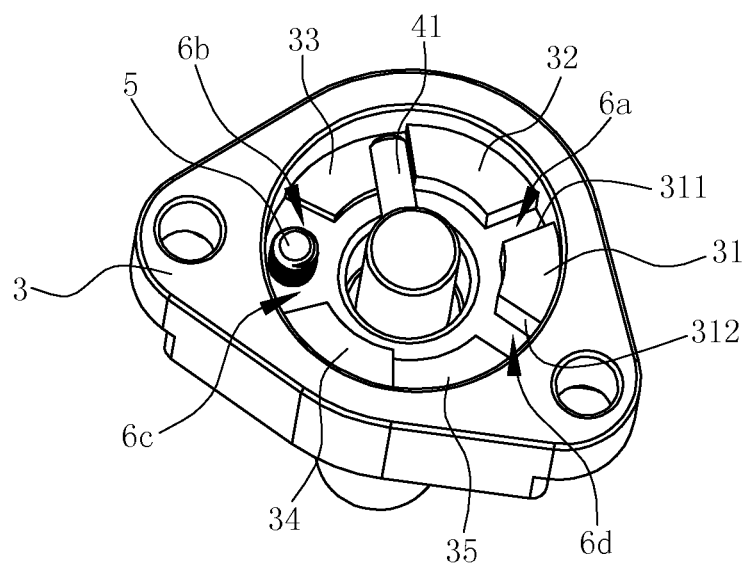
FIG. 8 is a perspective view of the valve rod and the valve cover showing the position between both (with the first gas supply, when in large fire state) in accordance with the embodiment of the present invention.

As shown in FIGS. 6-8, when the fire closing state is switched to a large fire state, the valve rod 4 is pressed down and rotated to drive the valve core 2 to rotate, the protrusion 41 moves downward to be separated from the first front recess 6a and rotates relatively to the valve body 1 in the first opening 14 till the protrusion 41 resists against the end of the first gap 14, it is just in the large fire state, then a hand is loosened, the valve rod 4 moves up under the action of the spring 10, meanwhile, the protrusion 41 is located between the second arc-shaped raised portion 32 and the third arc-shaped raised portion 33, the first large fire hole 23 is in communication with the first outlet 12, and the second gas supply passes through the inlet 11, the center hole 21, the first large fire hole 23 and the first outlet 12, then passes through the hose connected with the first outlet 12 and is delivered to the corresponding gas nozzle.

Figure 9:
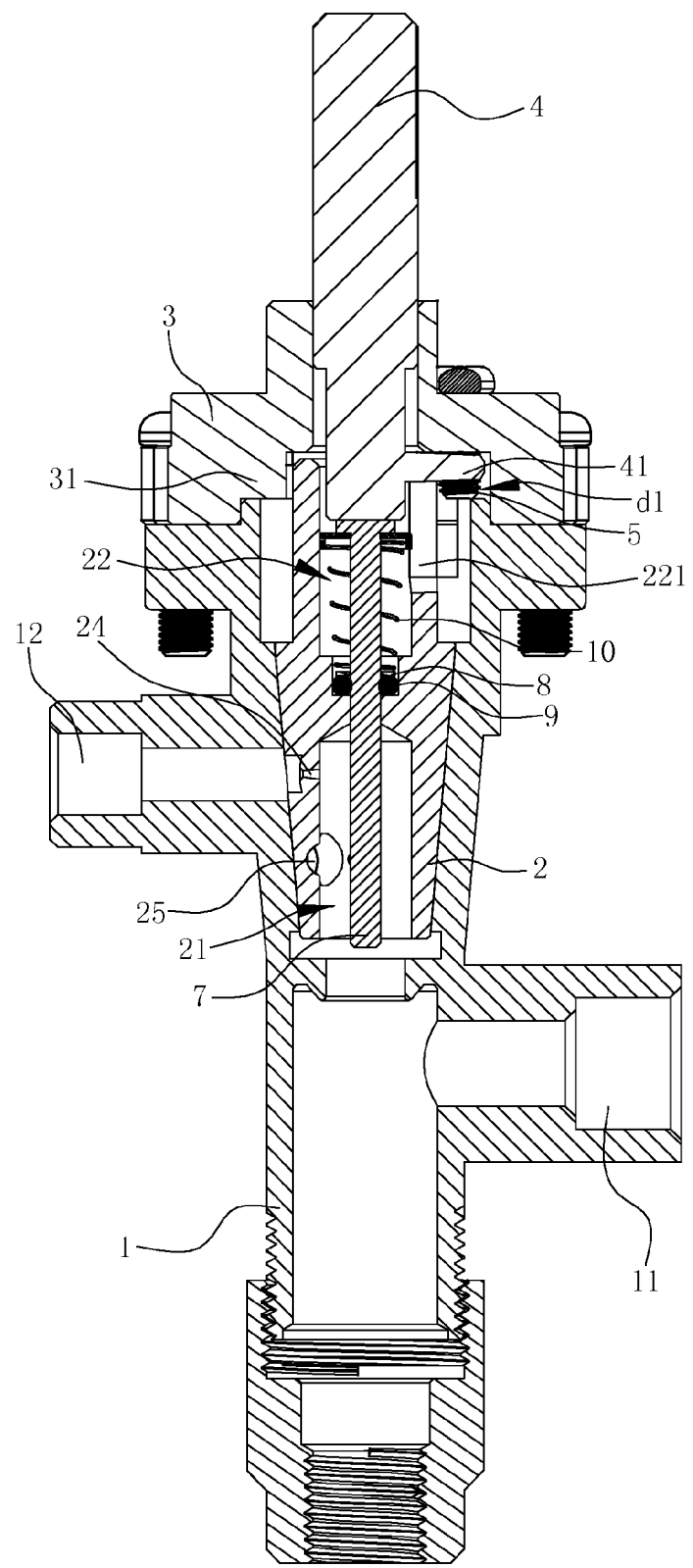
FIG. 9 is a sectional view of the gas valve (with the first gas supply, when in small fire state) in accordance with the embodiment of the present invention.
Figure 10:
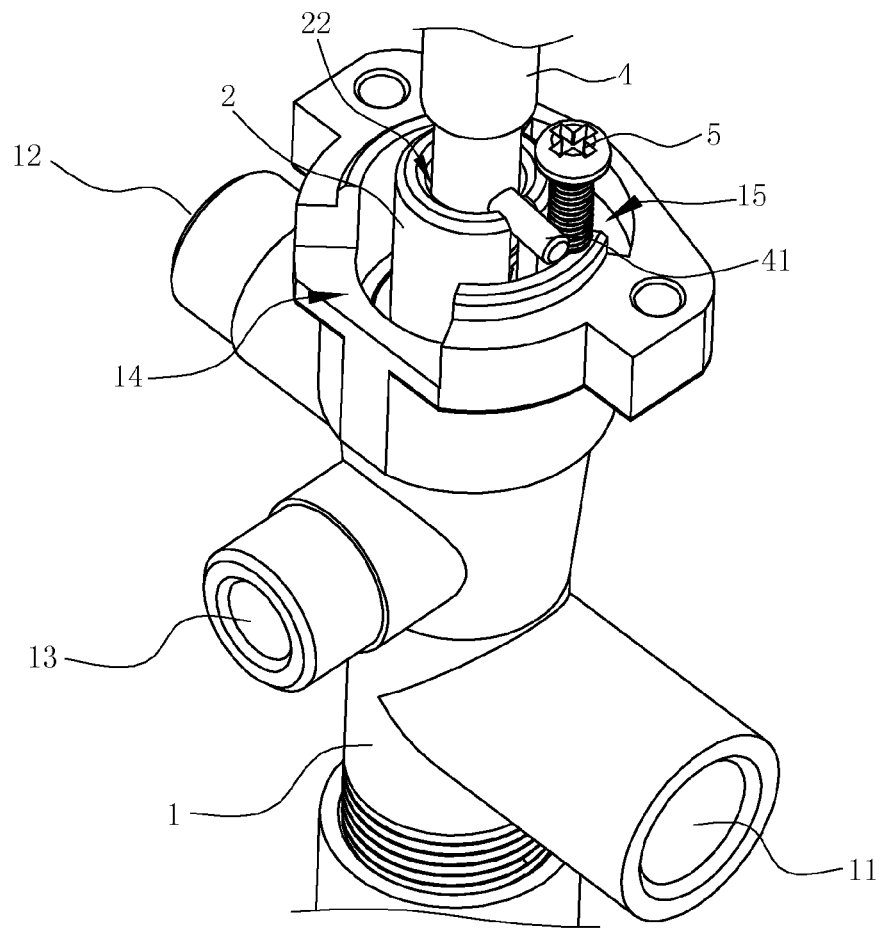
FIG. 10 is a perspective view of the valve rod and the valve body showing the position between both (with the first gas supply, when in small fire state) in accordance with the embodiment of the present invention.
Figure 11:
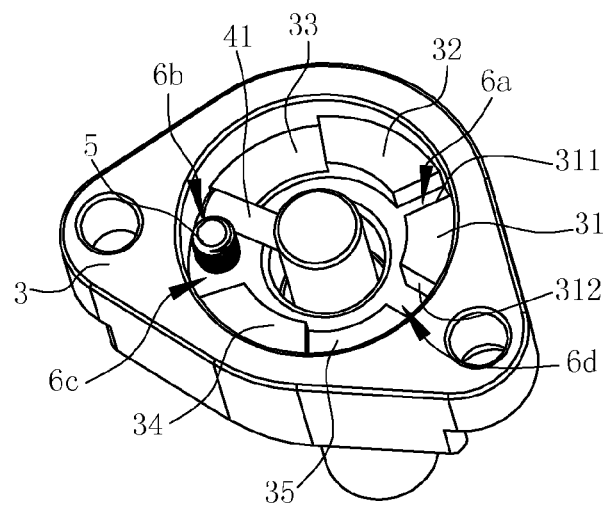
FIG. 11 is a perspective view of the valve rod and the valve cover showing the position between both (with the first gas supply, when in small fire state) in accordance with the embodiment of the present invention.

As shown in FIGS. 9-11, when the large fire state is switched to a small fire state, rotating the valve rod 4 to drive the valve core 2 to rotate, the protrusion 41 slides to the first space d1 from the third arc-shaped raised portion 33 and continuously moves inside the first space d1 till the protrusion 41 enters the first rear recess 6b defined between the third arc-shaped raised portion 33 and the regulator 5, the first small fire hole 24 is just in communication with the first outlet 12, and the second gas supply passes through the inlet 11, the center hole 21, the first small fire hole 24 and the first outlet 12, then passes through the hose connected with the first outlet 12 and is delivered to the corresponding gas nozzle.

Figure 13:
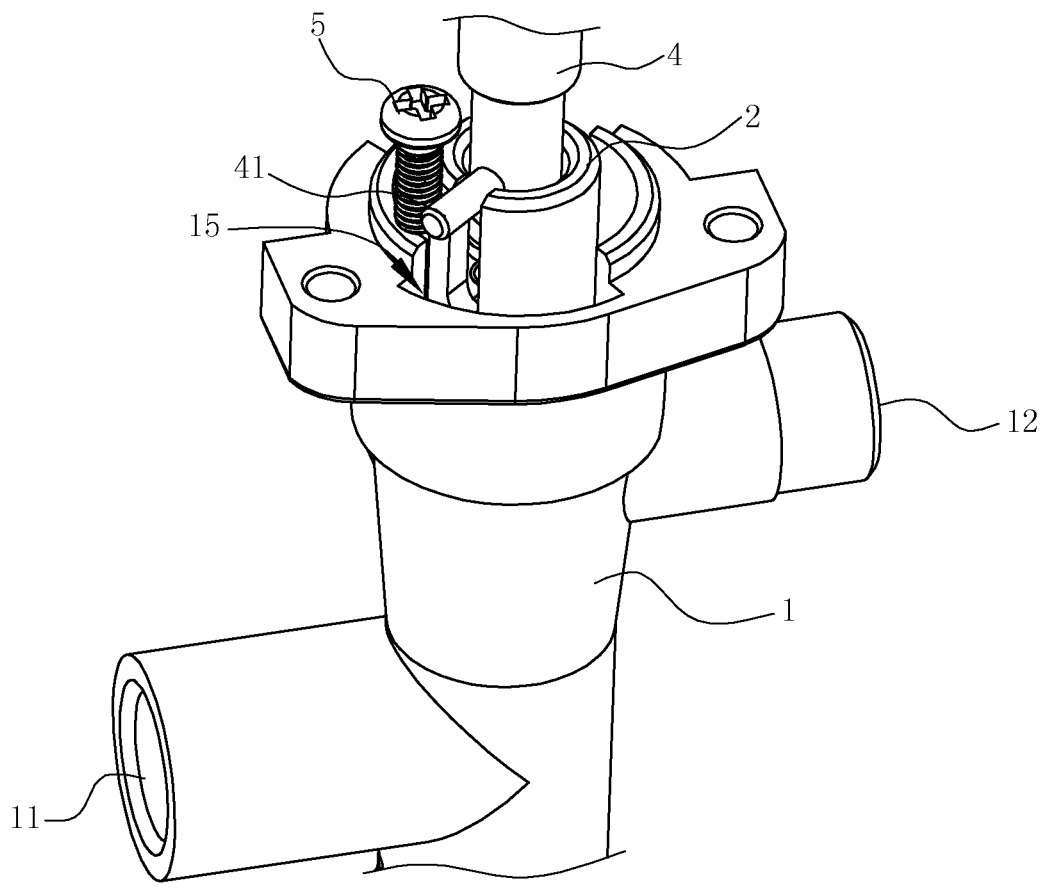
FIG. 13 is a perspective view of the valve rod and the valve body showing the position between both (with the second gas supply, when in fire closing state) in accordance with the embodiment of the present invention.

As shown in FIG. 10 and FIG. 13, when the first gas supply used by the gas valve is switched to the second gas supply, the regulator 5 is loosened till the regulator 5 is not stopped by the protrusion 41, then the valve rod 4 is rotated, the protrusion 41 can cross the regulator 5 and enter the second rotation positioning area B, meanwhile, the valve core 2 is rotated to the corresponding position along with the valve rod 4, the protrusion 41 is ensured to be in the second rotation positioning area B, and the regulator 5 is screwed down after switching, and the rear end of the regulator 5 is inserted into the inner chamber of the valve cover 3 to extend into the valve cover 3 to adjust position of the protrusion 41.

As shown in FIGS. 12-20, the gas supply used by the gas valve is the second gas supply: the protrusion 41 of the valve rod rotates in the second rotation positioning area B, both the second large fire hole 25 and the second small fire hole 26 can be in communication with the second outlet 13, and both of the first large fire hole 23 and the first small fire hole 24 are not in communication with the first outlet 12.

Figure 12:
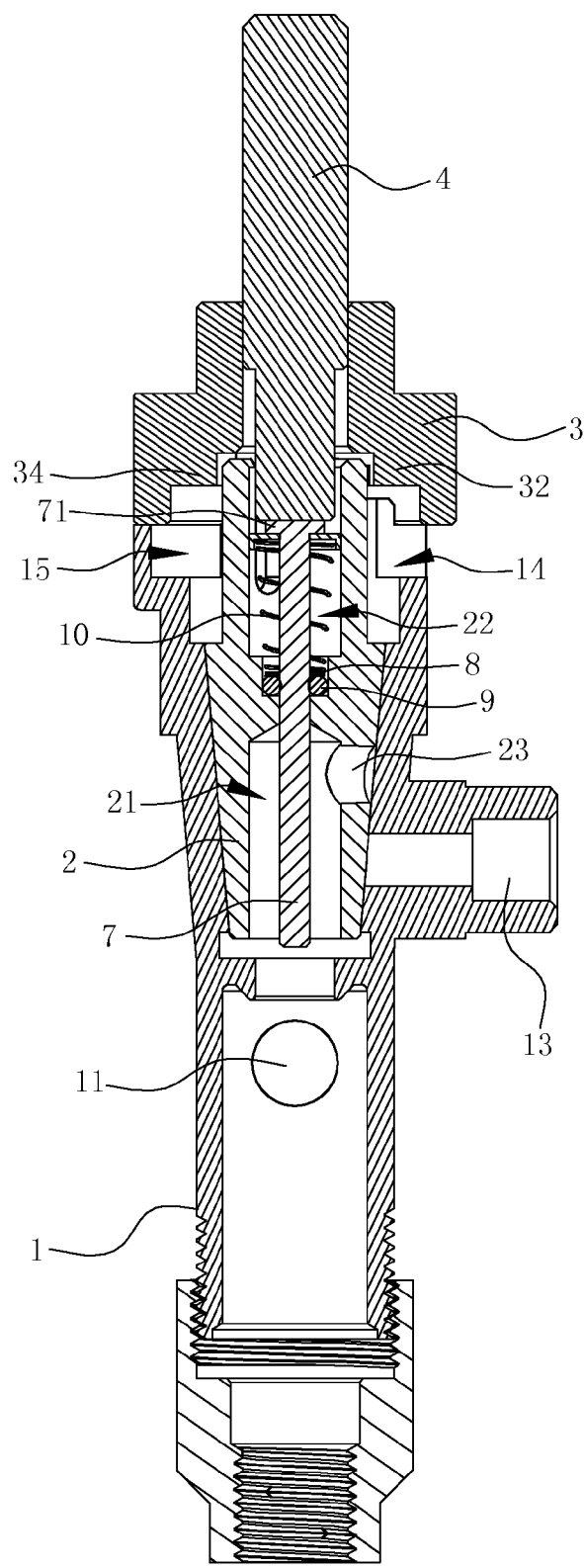
FIG. 12 is a sectional view of the gas valve (with the second gas supply, when in fire closing state) in accordance with the embodiment of the present invention.
Figure 14:
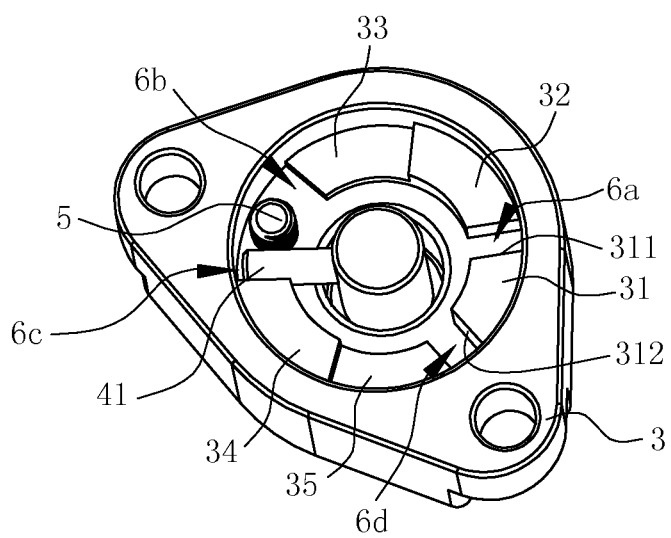
FIG. 14 is a perspective view of the valve rod and the valve cover showing the position between both, when in fire closing state) in accordance with the embodiment of the present invention.

As shown in FIGS. 12-14, in a fire closing state, the protrusion 41 is located inside the second front recess 6c, neither of the second large fire hole 25 nor a second small fire hole 26 are in communication with the second outlet 13.

Figure 15:
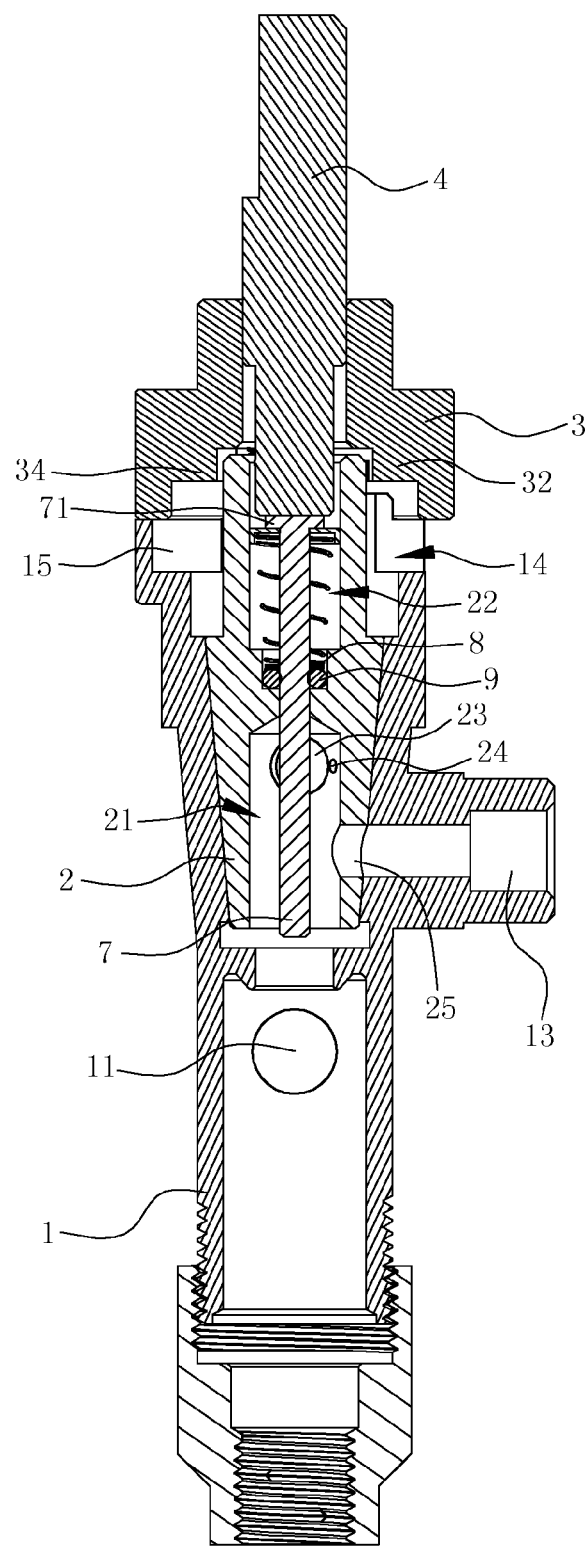
FIG. 15 is a sectional view of the gas valve (with the second gas supply, when in large fire state) in accordance with the embodiment of the present invention.
Figure 16:
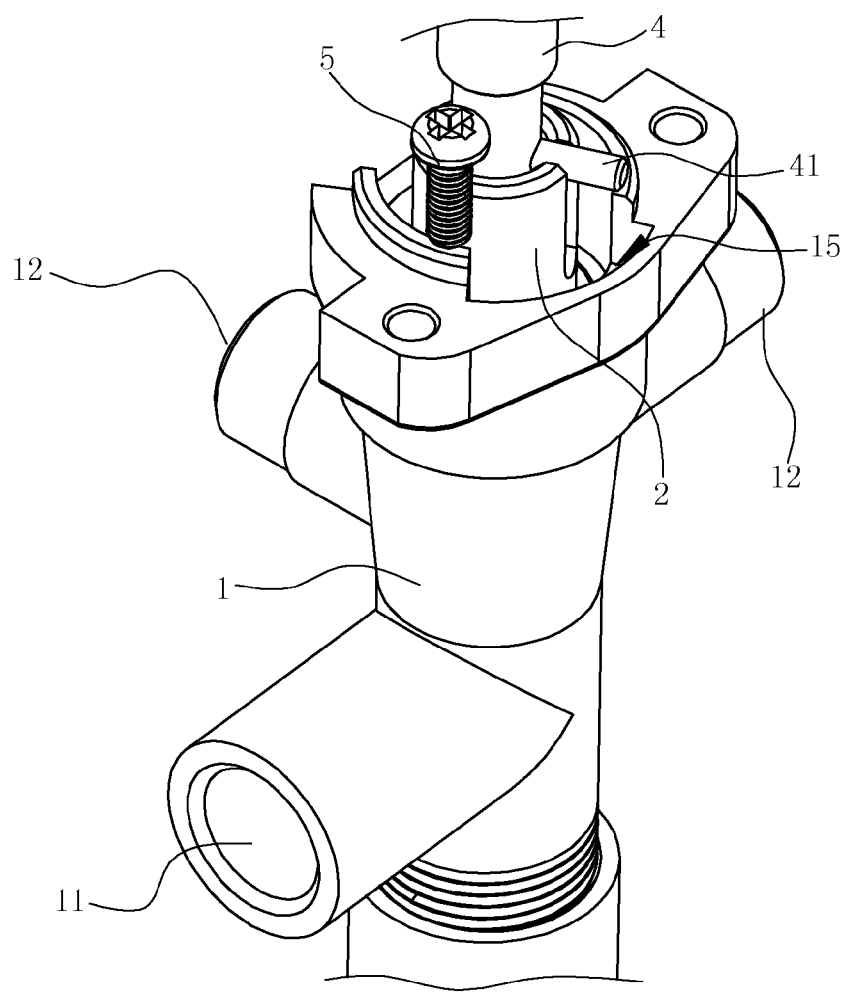
FIG. 16 is a perspective view of the valve rod and the valve body showing the position between both (with the second gas supply, when in large fire state) in accordance with the embodiment of the present invention.
Figure 17:
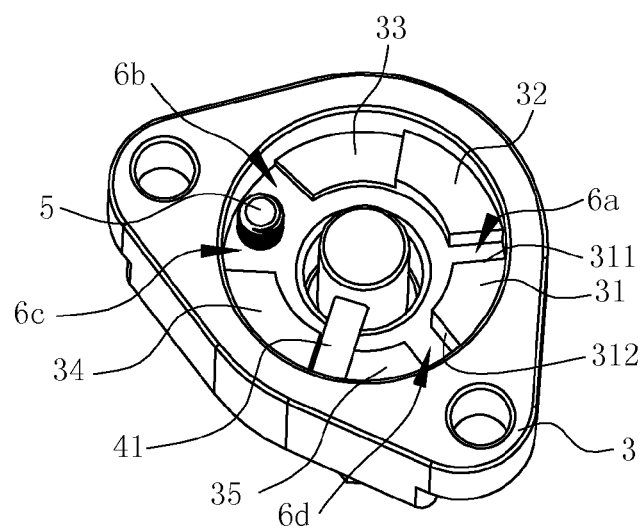
FIG. 17 is a perspective view of the valve rod and the valve cover showing the position between both (with the second gas supply, when in large fire state) in accordance with the embodiment of the present invention.

As shown in FIGS. 15-17, when the fire closing state is switched to a large fire state, the valve rod 4 is pressed down and rotated to drive the valve core 2 to rotate, the protrusion 41 moves downwards to be separated from the second front recess 6c and moves inside the second opening 15 till the protrusion 41 resists against the end of the second opening 15, it is just in the large fire state, then a hand is loosened, the valve rod 4 moves up under the action of the spring 10, meanwhile, the protrusion 41 is located between the forth arc-shaped raised portion 34 and the fifth arc-shaped raised portion 35, the second large fire hole 25 is in communication with the second outlet 13, and the second gas supply passes through the inlet 11, the center hole 21, the second large fire hole 25 and the second outlet 13, then passes through the hose connected with the second outlet 13 and is delivered to the corresponding gas nozzle.

Figure 18:
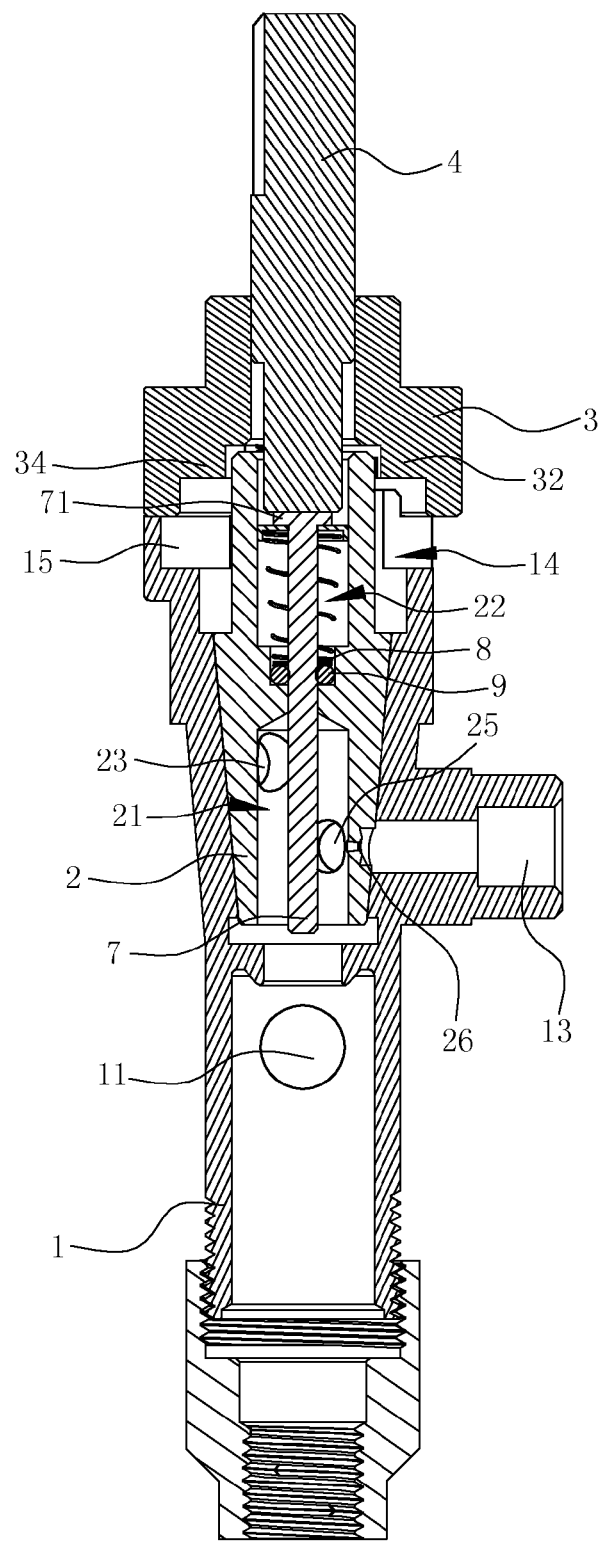
FIG. 18 is a sectional view of the gas valve (with the second gas supply, when in small fire state) in accordance with the embodiment of the present invention.
Figure 19:
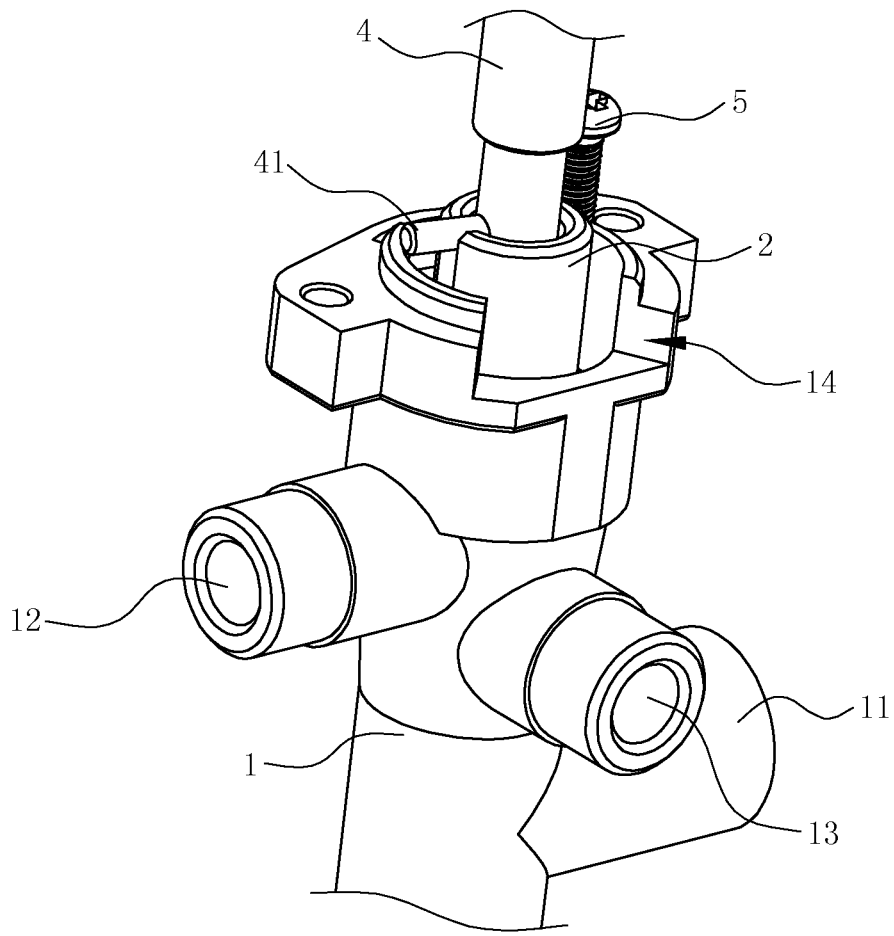
FIG. 19 is a perspective view of the valve rod and the valve body showing the position between both (with the second gas supply, when in small fire state) in accordance with the embodiment of the present invention.
Figure 20:
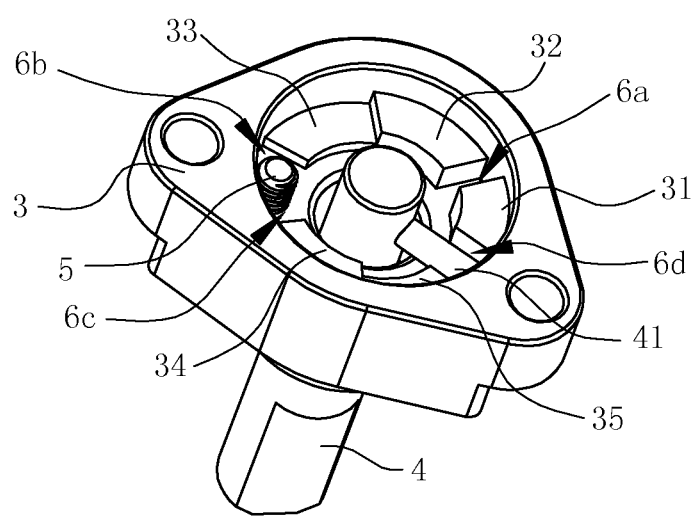
FIG. 20 is a perspective view of the valve rod and the valve cover showing the position between both (with the second gas supply, when in small fire state) in accordance with the embodiment of the present invention.
Figure 21:
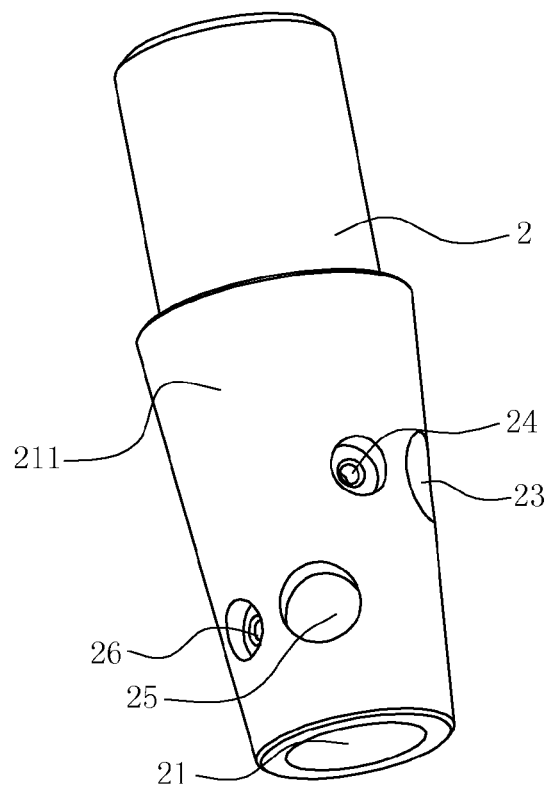
FIG. 21 is a perspective view of a valve core in accordance with the embodiment of the present invention.
Figure 22:
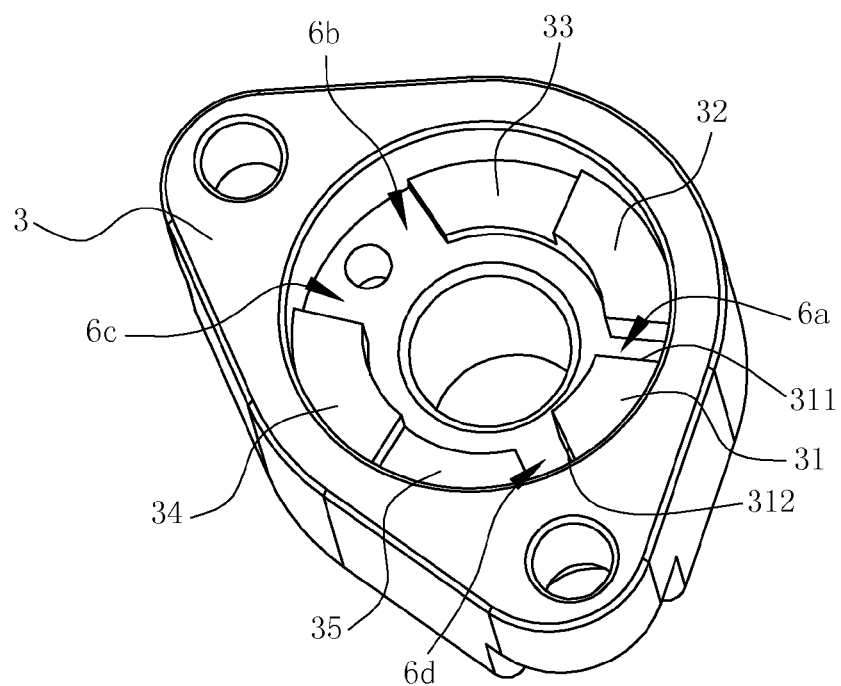
FIG. 22 is a perspective view of the valve cover in accordance with the embodiment of the present invention.

As shown in FIGS. 18-20, when the large fire state is switched to a small fire state, rotating the valve rod 4 to drive the valve core 2 to rotate, the protrusion 41 slides to the second space d2 from the fifth arc-shaped raised portion 35 and continuously moves inside the second space d2 till the protrusion 41 enters the second rear recess 6d defined between the fifth arc-shaped raised portion 35 and the first arc-shaped raised portion 31, the second small fire hole 26 is just in communication with the second outlet 13, and the second gas supply passes through the inlet 11, the center hole 21, the second small fire hole 26 and the second outlet 13, then passes through the hose connected with the second outlet 13 and is delivered to the corresponding gas nozzle.

The first gas supply and the second gas supply can be liquefied gas or natural gas.

The invention claimed is:

1. A gas valve capable of switching for two different gas supplies, comprising:
a valve body having a top end, an inlet, a first outlet and a second outlet;
a valve core rotatably disposed inside the valve body, having a peripheral surface and a first group of fire holes and a second group of fire holes disposed thereon;
a valve cover connected to the top end of the valve body, the valve cover having a center passage and an inner chamber with a first step and a second step;
a rotatable valve rod for driving the valve core, the rotatable valve rod being inserted into the center passage of the valve cover, the rotatable valve rod having a protrusion extending away from the valve rod;
a regulator with a rear end adjustably inserted into the inner chamber of the valve cover and the valve body, the regulator being able to adjust position of the protrusion;
wherein,
the inlet in communication with the first outlet through the first group of fire holes, and the inlet also in communication with the second outlet through the second group of fire holes;
the first step and the second step in the inner chamber of the valve cover limit rotation of the protrusion;
a first rotation positioning area is defined between the regulator and the first step, when the protrusion is inside the first rotation area, the first group of fire holes are in communication with the first outlet, and the second group of fire holes are not in communication with the second outlet;
a second rotation positioning area is defined between the regulator and the second step, when the protrusion is in the second rotation area, the second group of fire holes are in communication with the second outlet, and the first group of fire holes are not in communication with the first outlet;
when the regulator moves upward and the rear end of the regulator moves out of the inner chamber of the valve cover, the protrusion can move between both the first rotation positioning area and the second rotation positioning area.

2. The gas valve of claim 1, wherein the valve core has a spring recess for receiving a spring, and a center hole defined in an opposite end of the spring recess, the spring recess defines a wall and a receiving slot is formed on the wall for receiving the protrusion when the protrusion moves upward and downward;
the two groups of fire holes communicate with the center hole, the valve rod extends inside the spring recess;
the spring in the spring recess forces the valve rod to move upward;
the first step and the second step define a first arc-shaped raised portion inside the valve cover.

3. The gas valve of claim 1, wherein the first outlet is defined vertically above the second outlet, accordingly, the first group of fire holes are defined vertically above the second group of fire holes.

4. The gas valve of claim 1, wherein the regulator is a screw.

5. The gas valve of anyone of claim 1, wherein the first group of fire holes includes a first large fire hole and a first small fire hole;
when the protrusion rotates toward to the first step and is stopped by the first step, both of the first large fire hole and the first small fire hole are not in communication with the first outlet;
when the protrusion rotates toward middle of the first rotation positioning area, the first large fire hole communicates with the first outlet;

when the protrusion rotates toward the regulator in the first rotation positioning area and is stopped by the regulator, the first small fire hole communicates with the first outlet.

6. The gas valve of claim 5, wherein a second arc-shaped raised portion and a third arc-shaped raised portion adjacent to each other are formed on the valve cover and inside the first rotation positioning area, the first arc-shaped raised portion has a height that is taller than a height of the second arc-shaped raised portion, the height of the second arc-shaped raised portion is taller than a height of the third arc-shaped raised portion;
- a first front recess is defined between the first arc-shaped raised portion and the second arc-shaped raised portion and receives the protrusion for positioning the protrusion, when the protrusion is located inside the first front recess, neither the first large fire hole nor the first small fire hole are in communication with the first outlet;
- when the protrusion is located between the second arc-shaped raised portion and the third arc-shaped raised portion, the first large fire hole is in communication with the first outlet;
- a first rear recess is defined between the third arc-shaped raised portion and the regulator for receiving the protrusion and positioning the protrusion, when the protrusion is located inside the first rear recess, the first small fire hole is in communication with the first outlet.

7. The gas valve of claim 6, wherein a first space is formed between the top end of the valve body and the third arc-shaped raised portion for the protrusion to move downward and rotate, and a first opening is formed on the top end of the valve body providing a moving space for the protrusion when the protrusion moves downward and rotates relatively to the valve body;
- when the valve rod drives the valve core to moves downward and rotating away from a closing state of the fire holes and toward the first large fire hole, the protrusion moves inside the first opening;
- when the valve rod drives the valve core to moves downward and rotating the first large fire hole away from a communicating state toward the first small fire hole, the protrusion of the valve rod moves inside the first space.

8. The gas valve of anyone of claim 1, wherein the second group of fire holes includes a second large fire hole and a second small fire hole;
- when the protrusion of the valve rod rotates toward the regulator in the second rotation positioning area and is stopped by the regulator, neither of the second large fire hole nor a second small fire hole are in communication with the second outlet;
- when the protrusion rotates at the middle of the second rotation positioning area, the second large fire hole is in communication with the second outlet;
- when the protrusion rotates toward the second step and is stopped by the second step, the second small fire hole is in communication with the second outlet.

9. The gas valve of claim 8, wherein a forth arc-shaped raised portion and a fifth arc-shaped raised portion adjacent to each other are formed on the valve cover inside the second rotation positioning area, the forth arc-shaped raised portion has a height that is taller than a height of the fifth arc-shaped raised portion, the height of the first arc-shaped raised portion is taller than the height of the forth arc-shaped raised portion;
- a second front recess is defined between the forth arc-shaped raised portion and the regulator for receiving the protrusion and positioning the protrusion, when the protrusion is located inside the second front recess, neither the second large fire hole nor the second small fire hole are not in communication with the second outlet;
- when the protrusion is located between the forth arc-shaped raised portion and the fifth arc-shaped raised portion, the second large fire hole is in communication with the second outlet;
- a second rear recess is defined between the fifth arc-shaped raised portion and the first arc-shaped raised portion for receiving the protrusion and positioning the protrusion, when the protrusion is located inside the second rear recess, the second small fire hole is in communication with the second outlet.

10. The gas valve of claim 9, wherein a second space is formed between the top end of the valve body and the fifth arc-shaped raised portion for the protrusion to move downward and rotate, and a second opening is formed on the top end of the valve body providing a moving space for the protrusion when the protrusion moves downward and rotates relatively to the valve body;
- when the valve rod drives the valve core downward and rotates away from a closing state of the fire holes and toward the second large fire hole, the protrusion moves inside the second opening;
- when the valve rod drives the valve core downward and rotating away from a communicating state of the second large fire hole and toward the second small fire hole, the protrusion of the valve rod moves inside the second space.

\* \* \* \* \*